No. 673,997. Patented May 14, 1901.
C. A. CHAPMAN.
DEVICE FOR STARTING HORSES AT RACES.
(Application filed Sept. 18, 1900.)
(No Model.) 3 Sheets—Sheet 2.
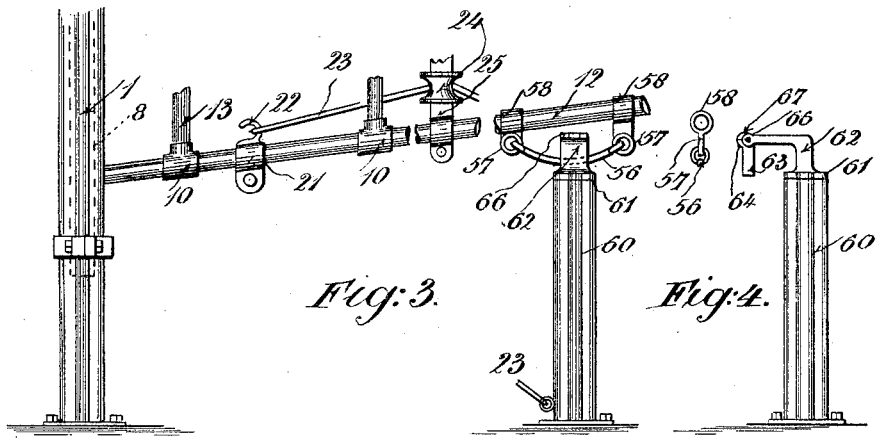
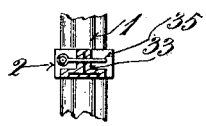
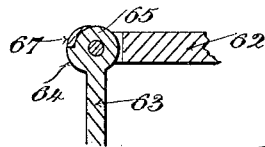
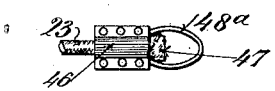
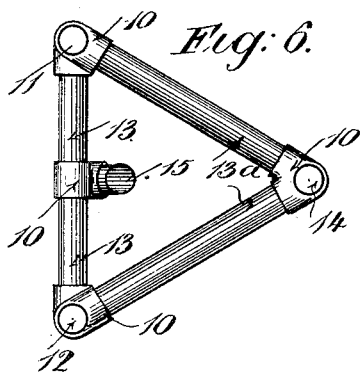
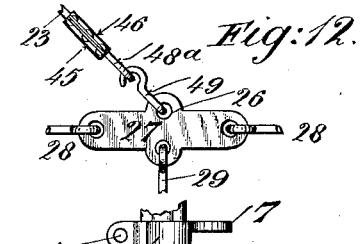
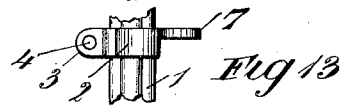
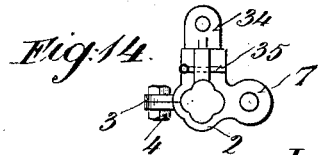
Witnesses:
R. W. Pittman
C. W. Smith
Inventor
Charles A. Chapman
By his Attorney
F. A. Richards

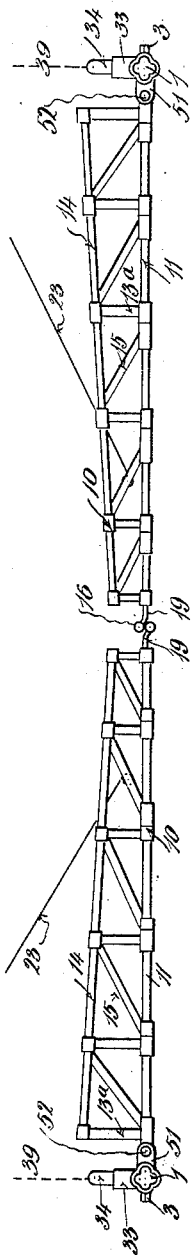

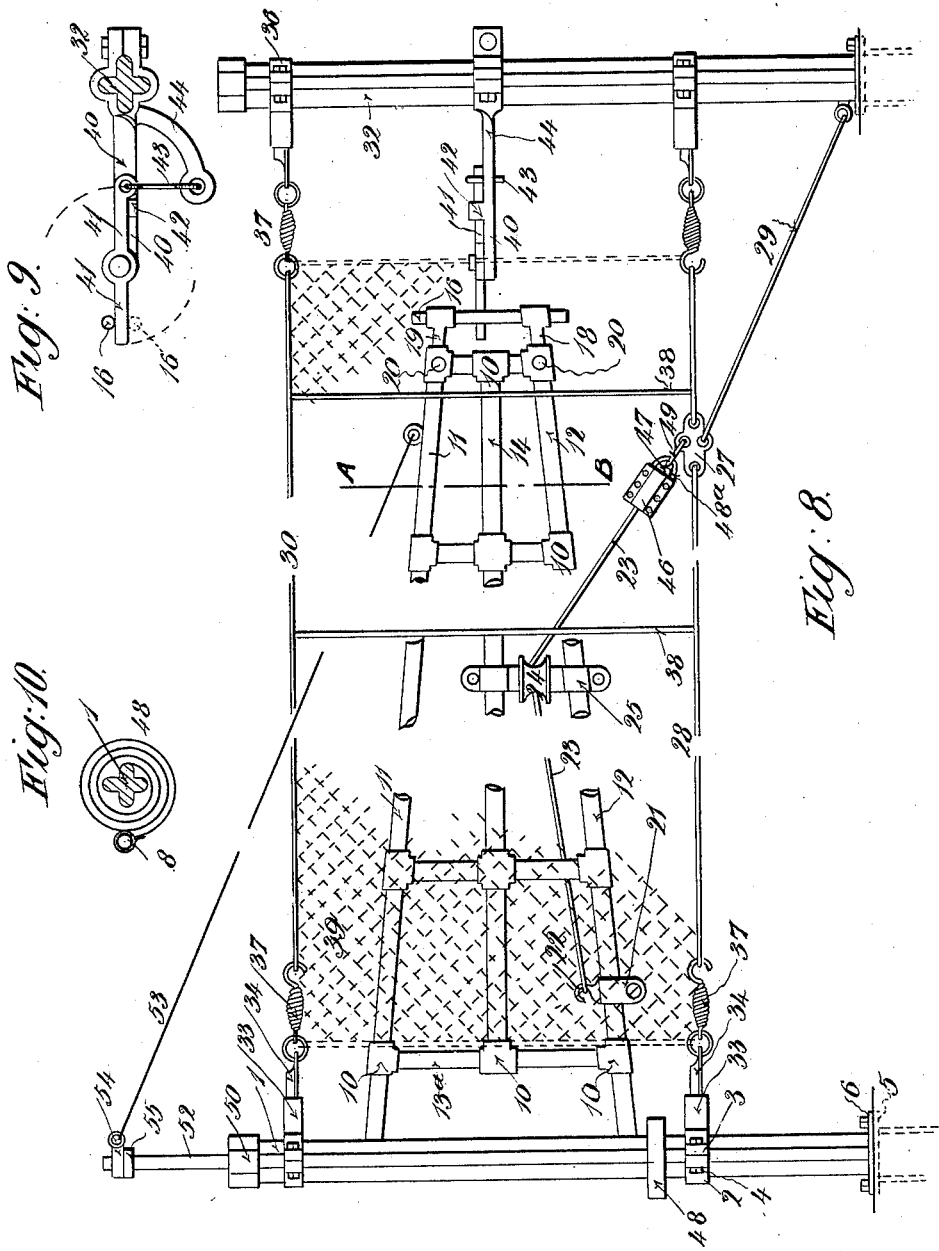

UNITED STATES PATENT OFFICE.

CHARLES ARTHUR CHAPMAN, OF HORLEY, ENGLAND.

DEVICE FOR STARTING HORSES AT RACES.

SPECIFICATION forming part of Letters Patent No. 673,997, dated May 14, 1901.

Application filed September 18, 1900. Serial No. 30,400. (No model.)

*To all whom it may concern:*

Be it known that I, CHARLES ARTHUR CHAPMAN, gentleman, a subject of the Queen of Great Britain and Ireland, residing at Glenthorne, Horley, in the county of Surrey, England, have invented certain new and useful Improvements in Devices for Starting Horses or the Like at Races; and I do hereby declare the following to be a full, clear, and exact description thereof.

This invention relates to an improved device for starting horses or the like at races; and it has for its object to produce a gate or gates for such purpose, which may be of very light construction and easily taken apart for storage or transport, and finally to provide a means for checking the gates when fully open and preventing any rebound of the said gates, which would be likely to injure the horses.

In order that the invention may be the better understood, drawings are appended, in which—

Figure 1 is a front elevational view of a pair of gates constructed according to the present invention. Fig. 2 is a plan of the same. Fig. 3 is an enlarged view of an alternative form of device for checking the gates as they open. Fig. 4 is a side view of same. Fig. 5 is an enlarged sectional view of part of the checking device. Fig. 6 is an enlarged transverse section of the gates on line A B, Fig. 8. Fig. 7 is an end view, partly in section, of a supporting bracket or arm for the cords supporting the netting for catching the gate. Fig. 8 is a back view of one the gates, to an enlarged scale, when open. Fig. 9 is a device for checking the rebound of the gate. Fig. 10 is a plan of an alternative means for operating the gates. Fig. 11 is an enlarged view illustrating a detail of construction of part of the means for actuating the gate. Fig. 12 is an enlarged view also showing a detail of the construction of the means for actuating the gates. Fig. 13 is an enlarged elevational view of one of the adjustable hinges for the gate. Fig. 14 is a plan of Fig. 13.

Referring to the drawings, 1 1 are posts, preferably of iron, of the section shown in Figs. 2, 8, 9, and 10, upon which are secured the adjustable collars 2, provided with lugs 3, slotted and through which pass the studs 4, by which the collars are adjusted and secured upon the posts 1. The posts may either drop into sockets let into the ground or they may be secured to plates 5, flush with the surface of the ground, bolts or studs being tapped thereinto and passing through plates 6, formed at the ends of the posts 1.

7 represents projecting plates cast or otherwise secured to the collars 2 and drilled at their outer ends to form eyes for the reception of the gate-pin 8.

The gates are preferably made up of a number of lengths of hollow rods or tubing, which screw into the sockets 10, by this means permitting the parts to be readily disconnected or connected, as the case may be, when it is desired to erect the gates or dismount them for transport or storage. Instead of screwing the parts together they may be permanently connected by brazing into the sockets 10, or the sockets may be formed with lugs thereon, which are slotted, and so form a clamp, the tubes being simply inserted therein and a stud or the like passing through the lugs tightened to secure the tube.

The transverse section of the gate is, as shown in Fig. 6, triangular, the base of the triangle being toward the horses, and said gates are tapered throughout their length, forming in outline the frustum of a triangular pyramid the base of which is attached to the post 1. As will be seen from the drawings, the horizontal members 11 12 are connected at intervals by means of lateral tubular stays 13 13$^a$, which former stays and the member 14 are in turn connected by the inclined or diagonal transverse stays 15, Figs. 1, 2, and 6. These stays may also be connected by any of the methods before described.

The outer end of each gate is provided with an adjustable bar 16, consisting of a vertical tubular piece, to which are secured the horizontal tubes 18 19, adapted to telescope into the tubes 11 12, and secured therein by set-studs 20. By this means the gates may be readily lengthened to suit the width of the course. Secured to the lower member 12, at or near the inner end thereof, is a clamp 21, provided with a hook 22, to which is attached one end of a rubber cord 23, passing therefrom around the sheave 24, which is secured by means of the clamps 25, formed upon the spindle thereof, to the members 12 15 or 12 14 at some suitable point from the end of the gate. The cord 23 after leaving the sheave is secured to an eye 26, formed upon the plate 27, carried by the lower stay 28, the purpose of which stay will be hereinafter more fully described. The plate 27 is secured against the pull of the rubber cord by means of a suitable stay 29, secured at one end to the plate 27 and at the other attached to the outer post. (See Fig. 8.)

Arranged parallel to the gate when the same is open are one, two, or more horizontal ropes, wires, or the like 28 30, of which the upper and lower ones are secured at their respective inner and outer ends to the posts 1 and to a second post 32, arranged in a line with the post 1. (See Fig. 8.) The post 1, as aforesaid, has collars 2 secured thereon, upon which collars are formed horizontal projections or arms 33 of inverted-T shape and hollow to receive a piece of T-shaped angle-iron 34, adjustably secured therein by means of the pins 35. The post 32 is also provided with collars 36, similar in all essential respects to the collars 2, but with the projection for the angle-iron only. The wires or the like members 28 30, lying longitudinally of the gate when open, are secured to the ends of the angle-irons by means of the coiled springs 37, or a rubber spring may be used for this purpose. Stretching across vertically from the wires 28 30 are two or more rubber cords or the like 38, which being without solid backing are adapted to yield freely in the direction of the gate's movement, so arranged that the gate when it flies open shall strike against the same and its further forward movement be arrested. To increase the efficiency of the cords, I may provide a net 39, (shown dotted in Fig. 8,) which would serve to arrest the gate also, in addition to forming a guard in the event of the cords giving way under the force of the blow given by the gates. The net would be secured to the two wire-supports 28 30.

From the foregoing it will be seen that upon the gates being closed the rubber cord 23 is stretched, and the gates being secured together by means of a suitable catch the course is closed and may be held so until the signal to start the race is given, when the device alluded to is operated to release the gates, which thereupon under the traction of the cord 23 fly open until arrested by the rubber cords 38.

As it is found in practice that there is a considerable rebound on the part of the gates, caused by the elasticity of the rubber-checking device, I provide a means to retain the gates when such rebound takes place. This means, as illustrated in Figs. 8 and 9, consists of a clamp secured to the post 32 and provided with a projecting horizontal arm 40, to the end of which is pivotally secured the lever 41, the outer end of which projects into the path of the end 16 of the gate. To prevent injury to said gate, a piece of rubber or other suitable material to form a buffer may be provided either upon the said piece 16 or upon the end of lever 41. To cause the lever always to occupy the desired position, I form upon the arm 40 a stop 42, against which the inner end of the arm abuts, and is held there by means of the rubber or other spring 43, secured to the end of the lever and to the outer end of the arm 44, respectively. By this means when the piece 16 strikes against the outer end of the lever 41 the said lever will yield thereto, permitting the gate to pass; but upon the return of the gate the lever prevents any movement beyond it, because its inner end is in contact with the abutment or stop 42.

To secure the actuating-cord 23 to its plate 27, I provide the same at the ends with a special clamping device, consisting of two plates 45 46, bent to encircle the cord, but such bent portion being, when the plates are secured together, less in diameter than the diameter of the cord 23. When it is desired to attach the clamp thereto, the cord is stretched, thereby reducing its diameter, and is kept so until the clamp has been secured thereon, when the tension on the rubber being relaxed a head 47 is formed at the end of the clamp and prevents the withdrawal of the rubber when under tension. An eye 48$^a$ is secured to the clamp, and the plate and clamp are secured together by means of a hook 49.

Instead of the rubber cord herein described for actuating the gates I may employ a coiled spring 48, encircling the post 1 and secured thereto at its inner end and at its outer attached to the hinge-pin 8, (see Figs. 8 and 10,) it being understood that although the two devices are illustrated in the former figure one only would in practice be employed.

To relieve the strain upon the hinge-pins of the gate, I may provide the posts 1 with collars 50, upon which is a horizontal projection 51, provided with an upwardly-extending pin or support 52, the center line of the said support and that of the gate-pin being coincident. From the support I may lead one or more suitable stays 53, provided at one end with a collar or the like 54, loosely fitting the support, upon which is fixed a collar 55, and secured at their outer ends to the gate. By this means the stays will move with the gates, and the said gates may be made of much lighter material than would be the case were all the weight of the gate to be supported by the hinge-pins.

The gates, as well as the sheaves 24, may be provided with ball-bearings.

The end tubes 16 of the gates when the same are closed lie one in front of the other, as shown in Fig. 2, and are held together by means of a suitable latch.

As an alternative means for arresting the gates, under which the net or rubber cords may be dispensed with, I provide the gate with one or more devices consisting of short lengths of rubber or other material, which may be attached at any convenient point or points to the bottom rail of the gate, as illustrated in Figs. 3, 4, and 5. From these it will be seen that the short length of rubber 56 is provided at each end with a suitable eye, attached either directly to the rings 57 57 upon the clamps 58 58, secured to the aforesaid bottom rail, or it may have at each end a coiled spring, the springs being secured to the aforesaid clamps. One or more of the aforesaid rubbers may be secured to each gate, and they are arranged so as to be below the bottom rail and so disposed that upon the gates flying open the catch or catches carried by the posts 60 shall engage with the said cords 56 and arrest the further progress of the gate. The catches are preferably of the form illustrated by the drawings, from which it will be seen that they consist of sole-plates 61, upon which are cast or otherwise formed the L-shaped arms 62, to the forward end of which is pivotally secured the hanging plate 63, free to swing only in one direction—that is, in the direction of motion of the gate when opening, and prevented from swinging in the opposite direction by the projection 64, formed upon the boss 65, by which the said swinging plate is secured to the arm. Formed upon a boss 66 at the end of the arm is a second projection 67, adapted to normally abut against the first, 60, and so prevent any movement other than as above stated. The plates are secured to the top of suitable posts, of which in the case of a number of rubber loops being employed there would be one for each loop, the posts being of such height as to permit the lower rail of the gate to clear the arm freely in its passage thereover. By means of the above-described arrangement when the gate is released and flies open the rubber loop will come into contact with the depending pivoted plate and, raising the same, will pass thereunder, allowing the plate to assume its normal position, as shown in Figs. 3 and 4, so that when the further progress of the gate is checked by the rubber coming into contact with the vertical part of the arm 62 the rebound of the gate will be limited by the engagement of the rubber 56 with the swinging plate 63, which, as aforesaid, will yield only in a direction agreeing with the advancing movement of the gate. By this means the gate may be operated without using a net and at the same time damage to the gate, which would arise were it to be arrested by some unyielding obstacle, may be avoided. The cord for operating the gate would in this instance be secured to the post, as shown in Fig. 3.

To disengage the rubber from the catch, the swinging plate is lifted and the cord passed thereunder.

I may, if desired, reverse the positions of the catch and loop by placing the catch upon the gate and securing the loop in any convenient manner to the top of the post or posts, as the case may be. It will, however, be understood that the precise form and arrangement described herein and illustrated by the appended drawings can be more or less modified, as may be found in practice to be desirable.

Having now particularly described and ascertained the nature of my said invention and in what manner the same is to be performed, I declare that what I claim is—

1. In a device for starting horses or the like at races; a gate movably supported at one end to turn across the track; a spring in contact with and secured to said gate to open it; and an elastic checking device extending between end supports to receive the impact of the gate when opened.

2. In a device for starting horses or the like at races; a gate movably supported at one end to turn across the track; a spring connected to said gate to open it; and an elastic checking device extending between end supports to receive the impact of the gate at or near its outer end when opened.

3. In a device for starting horses or the like at races, a gate movably supported at one end to turn across the track; a spring connected to said gate to open it; and one or more members lying longitudinally of the gate when open extending from its support and carrying an elastic checking device to receive its impact.

4. In a device for starting horses or the like at races, a gate movably supported at one end to turn across the track; a spring connected to said gate to open it; members lying longitudinally of the gate when open; and elastic members extending between said longitudinal members to receive the impact of the gate.

5. In a device for starting horses or the like at races, a gate movably supported at one end to turn across the track; a spring connected to said gate to open it; and one or more members lying longitudinally of the gate when open carrying an elastic checking device and a net.

6. In a device for starting horses or the like at races, a gate movably supported at one end to turn across the track; a spring connected to said gate to open it; a checking device to receive the impact of the gate when open; a pivoted latch situated in the path of the gate; a stop therefor; and yieldable means for holding said latch against the stop.

7. In a device for starting horses or the like at races, a gate movably supported at one end to turn across the track; a spring connected to said gate to open it; a checking device to receive the impact of the gate when open; and a connection between the spring and checking device.

8. In a device for starting horses or the like at races, a gate movably supported at one end to turn across the track; an elastic cord connected to said gate to open it; and a checking device to receive the impact of the gate when open, said elastic cord being also connected to the checking device.

9. In a device for starting horses or the like at races; a gate formed of longitudinal rods secured together in the form of a frustum of a triangular pyramid, the base of which is secured to the gate-post.

10. In a device for starting horses or the like at races; a gate formed of longitudinal rods secured together by sockets in the form of a frustum of a triangular pyramid, the base of which is secured to the gate-post.

11. In a device for starting horses or the like at races; a gate formed of longitudinal rods secured together in the form of a frustum of a triangular pyramid, the base of which is secured to the gate-post; and lateral stays between the longitudinal members.

12. In a device for starting horses or the like at races; a gate formed of longitudinal rods secured together in the form of a frustum of a triangular pyramid, the base of which is secured to the gate-post; and diagonal stays between the longitudinal members.

In witness whereof I have hereunto set my hand in the presence of two witnesses.

CHARLES ARTHUR CHAPMAN.

Witnesses:
JOHN H. JACK,
H. B. WARD.